US012565373B2

(12) United States Patent
Minnette

(10) Patent No.: US 12,565,373 B2
(45) Date of Patent: Mar. 3, 2026

(54) DISPENSER APPLICATOR PACKAGING

(71) Applicant: Nypro Inc., Clinton, MA (US)

(72) Inventor: Jeffrey C. Minnette, Clinton, MA (US)

(73) Assignee: Nypro Inc., Clinton, MA (US)

( * ) Notice: Subject to any disclaimer, the term of this patent is extended or adjusted under 35 U.S.C. 154(b) by 371 days.

(21) Appl. No.: 18/269,312

(22) PCT Filed: Feb. 25, 2022

(86) PCT No.: PCT/US2022/017889
§ 371 (c)(1),
(2) Date: Jun. 23, 2023

(87) PCT Pub. No.: WO2022/187091
PCT Pub. Date: Sep. 9, 2022

(65) Prior Publication Data
US 2024/0067439 A1 Feb. 29, 2024

Related U.S. Application Data

(60) Provisional application No. 63/156,676, filed on Mar. 4, 2021.

(51) Int. Cl.
| *B65D 83/00* | (2006.01) |
| *B65D 25/38* | (2006.01) |
| *B65D 47/42* | (2006.01) |
| *B65D 83/76* | (2006.01) |

(52) U.S. Cl.
CPC ............. *B65D 83/76* (2025.01); *B65D 47/42* (2013.01); *Y02W 30/80* (2015.05)

(58) Field of Classification Search
CPC ........ B65D 83/76; B65D 47/42; Y02W 30/80
See application file for complete search history.

(56) References Cited

U.S. PATENT DOCUMENTS

| 5,356,037 | A | 10/1994 | Harrold | |
| 5,421,663 | A | 6/1995 | Bravo | |
| 5,984,553 | A | 11/1999 | Piscopo et al. | |
| 7,435,028 | B2 | 10/2008 | Cummings et al. | |
| D645,754 | S | 9/2011 | Corbett et al. | |
| 8,157,114 | B2 * | 4/2012 | Baylous | B65D 83/761 |
| | | | | 401/175 |
| 8,177,102 | B2 * | 5/2012 | Hammond | F04B 19/24 |
| | | | | 222/386 |
| 8,430,262 | B2 | 4/2013 | Corbett et al. | |
| D692,768 | S | 11/2013 | Corbett et al. | |

(Continued)

FOREIGN PATENT DOCUMENTS

| CN | 203889338 U | 10/2014 |
| EP | 0248278 A2 | 12/1987 |

(Continued)

*Primary Examiner* — Frederick C Nicolas
(74) *Attorney, Agent, or Firm* — Young Basile Hanlon & MacFarlane, P.C.

(57) ABSTRACT

Disclosed herein is dispenser applicator packaging. A package includes a tubular structure, a barrier layer fused to an inner surface of the tubular structure, a ratcheting mechanism fused to the barrier layer, an elevator mechanism placed at one end of the tubular structure, an elevator seal fused to the elevator mechanism, and an access seal fused to a useable material at a remaining end of the tubular structure.

19 Claims, 8 Drawing Sheets

(56) References Cited

U.S. PATENT DOCUMENTS

| | | | |
|---|---|---|---|
| D692,769 S | 11/2013 | Corbett et al. | |
| D694,635 S | 12/2013 | Corbett et al. | |
| 8,663,419 B2 | 3/2014 | Corbett et al. | |
| 8,807,377 B2 | 8/2014 | Corbett et al. | |
| 8,991,635 B2 | 3/2015 | Myerscough | |
| 9,126,717 B2 | 9/2015 | Myerscough | |
| 9,126,719 B2 | 9/2015 | Corbett et al. | |
| 9,452,857 B2 | 9/2016 | Corbett et al. | |
| 9,574,307 B2 | 2/2017 | Corbett et al. | |
| 9,795,206 B2 * | 10/2017 | Ellsworth | A45D 40/04 |
| 10,005,222 B2 | 6/2018 | Corbett et al. | |
| 10,005,605 B2 | 6/2018 | Corbett et al. | |
| 10,070,742 B2 * | 9/2018 | Chen | A47G 19/183 |
| 10,080,451 B2 * | 9/2018 | Chen | B05C 17/012 |
| 10,687,602 B2 * | 6/2020 | Thulin | A45D 40/04 |
| 10,716,385 B2 * | 7/2020 | Thulin | A45D 40/04 |
| 11,167,904 B2 | 11/2021 | Corbett et al. | |
| 11,286,104 B2 | 3/2022 | Corbett et al. | |
| 11,383,887 B2 | 7/2022 | Corbett et al. | |
| 2011/0290798 A1 | 12/2011 | Corbett et al. | |
| 2012/0024897 A1 | 2/2012 | Corbett et al. | |
| 2012/0145710 A1 | 6/2012 | Corbett et al. | |
| 2014/0252032 A1 | 9/2014 | Corbett et al. | |
| 2015/0314916 A1 | 11/2015 | Corbett et al. | |
| 2016/0159545 A1 | 6/2016 | Corbett et al. | |
| 2016/0174684 A1 | 6/2016 | Ellsworth | |
| 2019/0135479 A1 | 5/2019 | Corbett et al. | |
| 2021/0284418 A1 | 9/2021 | Corbett et al. | |
| 2022/0169437 A1 | 6/2022 | Corbett et al. | |
| 2022/0340335 A1 | 10/2022 | Corbett et al. | |
| 2023/0054953 A1 | 2/2023 | Graham et al. | |
| 2023/0331449 A1 | 10/2023 | Graham et al. | |
| 2023/0371675 A1 | 11/2023 | Graham et al. | |

FOREIGN PATENT DOCUMENTS

| | | |
|---|---|---|
| EP | 0431304 A2 | 6/1991 |
| JP | S49-023351 U | 2/1974 |
| WO | 2014031869 A1 | 2/2014 |
| WO | 2021188366 A1 | 9/2021 |
| WO | 2022055921 A1 | 3/2022 |

* cited by examiner

1000

1100

1200

1512

1300

1400

1500

1520

1700

1510

4000

4100

4200

4300

4400

4500

5000

5100

5200

5300

5400

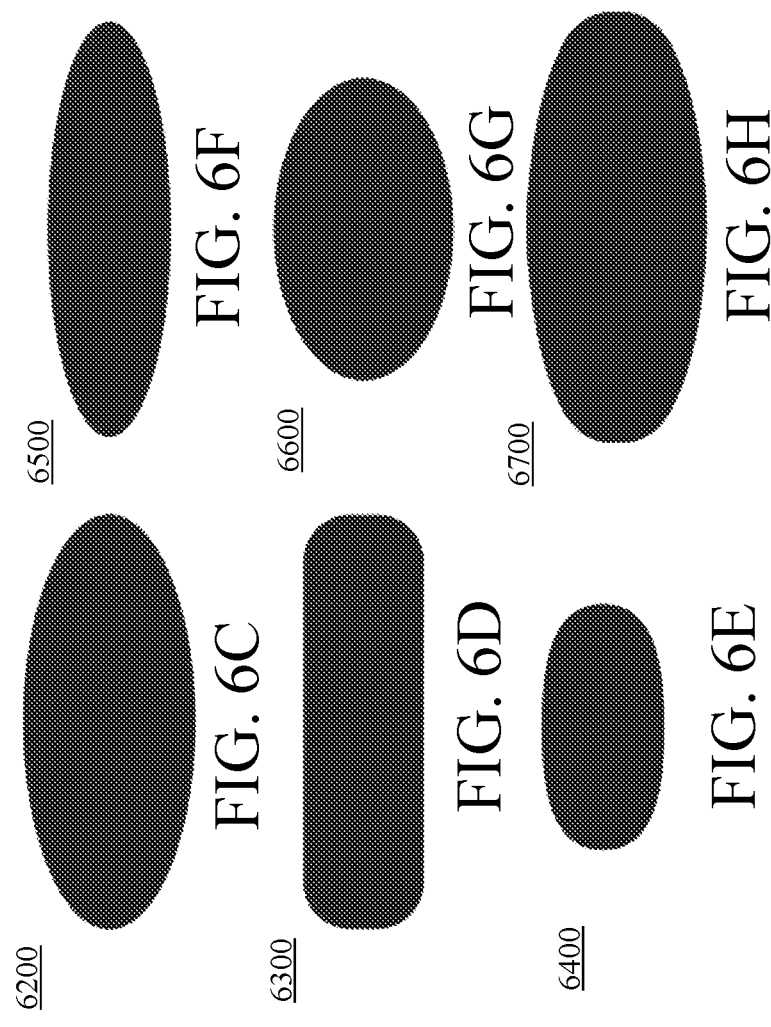
FIG. 6C
6200
FIG. 6D
6300
FIG. 6E
6400
FIG. 6F
6500
FIG. 6G
6600
FIG. 6H
6700
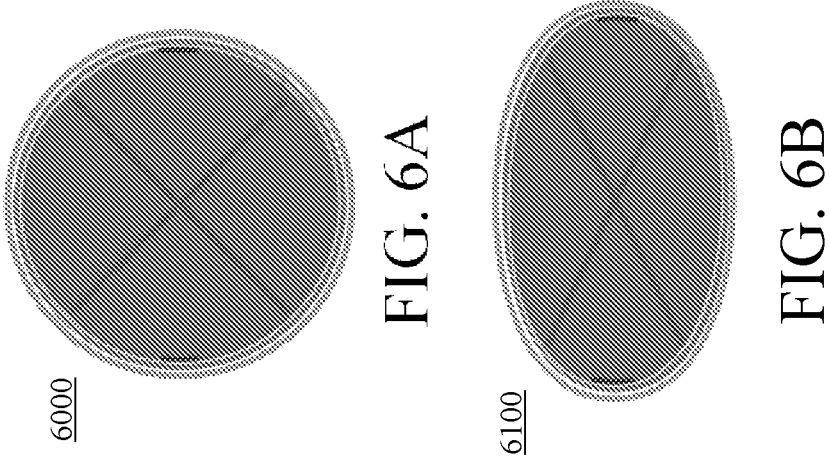
FIG. 6A
6000
FIG. 6B
6100

DISPENSER APPLICATOR PACKAGING

CROSS-REFERENCE TO RELATED APPLICATION(S)

This application is a national stage entry of International Patent Application Serial No. PCT/US2022/017889, filed Feb. 25, 2022, which claims priority to U.S. Provisional Application Ser. No. 63/156,676, filed Mar. 4, 2021, the entire disclosures of which are incorporated herein.

TECHNICAL FIELD

This disclosure relates to packaging and in particular, packages for holding and dispensing materials.

BACKGROUND

Packaging commonly used for dispenser applicator have numerous issues or disadvantages. These types of packages are generally not recyclable. They are unable to go through the grinding, cleaning, bleaching, and other processing to produce recycled materials.

SUMMARY

Disclosed herein are methods and systems for dispenser applicator packaging. In an implementation, a package includes a tubular structure, a barrier layer fused to an inner surface of the tubular structure, a ratcheting mechanism fused to the barrier layer, an elevator mechanism placed at one end of the tubular structure, an elevator seal fused to the elevator mechanism, and an access seal fused to a useable material at a remaining end of the tubular structure.

In some implementations, a package includes a tubular structure, a barrier layer fused to an inner surface of the tubular structure, a ratcheting mechanism fused to the barrier layer, an elevator mechanism placed at one end of the tubular structure, an elevator seal fused to the elevator mechanism, and an access seal fused to a useable material at a remaining end of the tubular structure. In some implementations, the ratcheting mechanism is configured to provide a positive stop when using the package. In some implementations, the tubular structure further comprises a pair of bead moldings at each end of the tubular structure. In some implementations, the elevator mechanism further comprises a base and a pair of legs connected to the base. The pair of legs are configured to engage the pair of bead molding as a stopping mechanism. In some implementations, the base further comprises overhang sections extending from the base, wherein the overhang sections are configured to engage the ratcheting mechanism as a stopping mechanism. In some implementations, the ratcheting mechanism is configured to provide a metered amount of the useable material. In some implementations, the ratcheting mechanism is configured to provide access to a metered amount of the useable material. In some implementations, the barrier layer is impermeable and non-reactive with the useable material. In some implementations, the tubular structure further comprises an outer tubular structure and an inner tubular structure. The barrier layer is fused to an inner surface of the inner tubular structure, the elevator mechanism is placed at one end of the inner tubular structure, and the access seal is fused to the useable material at a remaining end of the inner tubular structure.

In some implementations, a refillable device includes a dispenser applicator shell and a package as described and configured to fit within the dispenser applicator shell. The package further including a package engagement mechanism integrated with the ratchet mechanism. The package engagement mechanism configured to engage the dispenser applicator shell when the package is placed in the dispenser applicator shell. In some implementations, the dispenser applicator shell further includes an engagement mechanism configured to engage the package engagement mechanism when the package is placed in the dispenser applicator shell. In some implementations, the engagement mechanism is a groove and the package engagement mechanism includes a bead configured to engage the groove. In some implementation, the ratcheting mechanism is configured to provide a positive stop when using the package. In some implementations, the tubular structure further includes a pair of bead moldings at each end of the tubular structure. In some implementations, the elevator mechanism further includes a base and a pair of legs connected to the base. The pair of legs are configured to engage the pair of bead molding as a stopping mechanism. In some implementations, the base further includes overhang sections extending from the base. The overhang sections are configured to engage the ratcheting mechanism as a stopping mechanism. In some implementations, the ratcheting mechanism is configured to provide a metered amount of the useable material. In some implementations, the ratcheting mechanism is configured to provide access to a metered amount of the useable material. In some implementations, the barrier layer is impermeable and non-reactive with the useable material.

BRIEF DESCRIPTION OF THE DRAWINGS

The disclosure is best understood from the following detailed description when read in conjunction with the accompanying drawings and are incorporated into and thus constitute a part of this specification. It is emphasized that, according to common practice, the various features of the drawings are not to-scale. On the contrary, the dimensions of the various features are arbitrarily expanded or reduced for clarity.

FIGS. 6A-H are diagrams of an example shapes for dispenser applicator packages in accordance with implementations.

DETAILED DESCRIPTION

Figure 1:
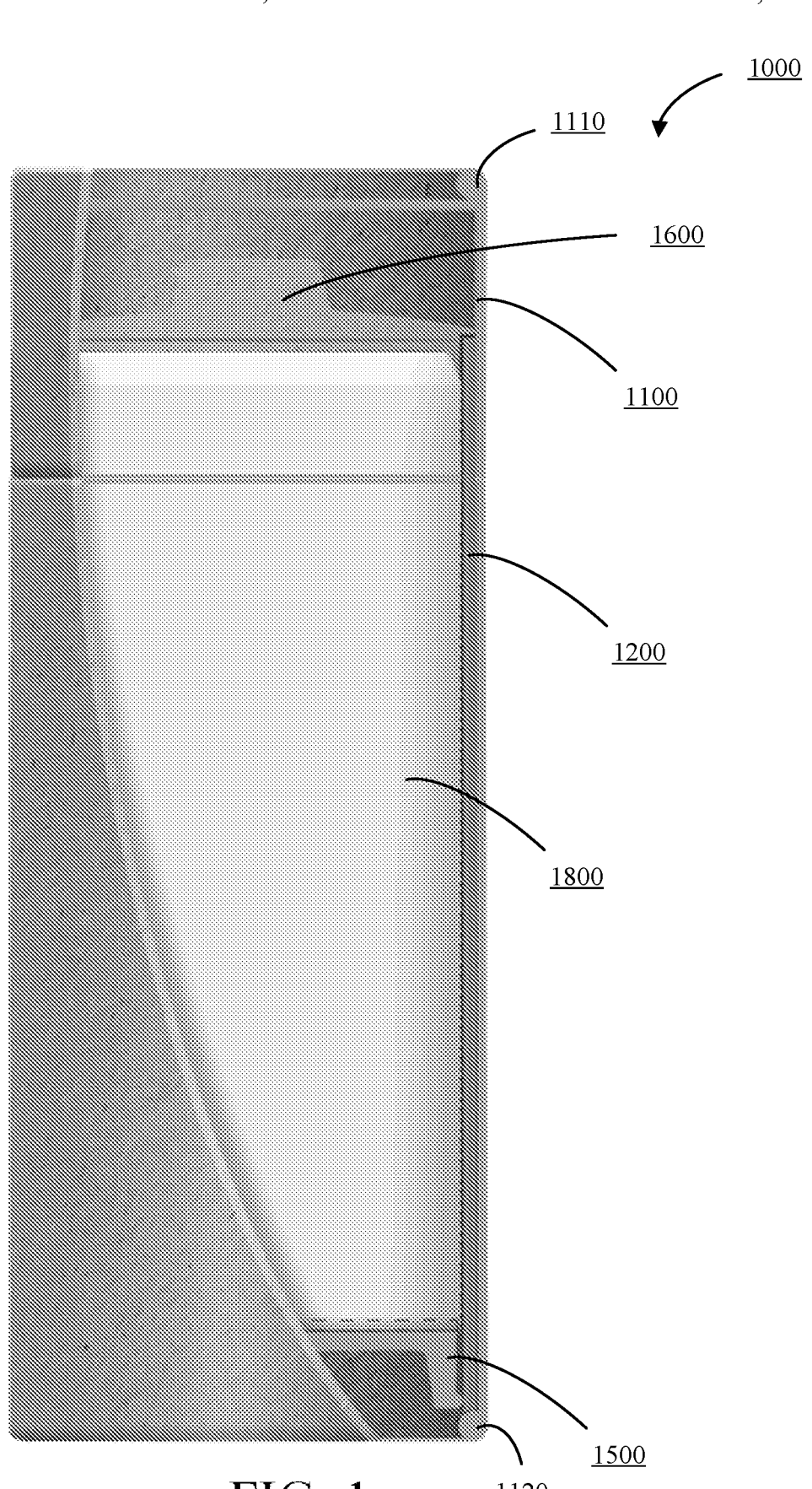
FIG. 1 is a diagram of an example dispenser applicator package in accordance with implementations.

The figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions, and methods. Those of ordinary skill may thus recognize that other elements and/or steps may be desirable or necessary to implement the devices, systems, compositions, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Embodiments are provided throughout so that this disclosure is sufficiently thorough and fully conveys the scope of the disclosed embodiments to those who are skilled in the art. Numerous specific details are set forth, such as examples of specific aspects, devices, and methods, to provide a thorough understanding of embodiments of the present disclosure. Nevertheless, it will be apparent to those skilled in the art that certain specific disclosed details need not be employed, and that embodiments may be embodied in different forms. As such, the exemplary embodiments set forth should not be construed to limit the scope of the disclosure.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, steps, operations, elements, and/or components, but do not preclude the presence or addition of one or more other features, steps, operations, elements, components, and/or groups thereof.

The steps, processes, and operations described herein are thus not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

Yet further, although the terms first, second, third, etc. may be used herein to describe various elements, steps or aspects, these elements, steps or aspects should not be limited by these terms. These terms may be only used to distinguish one element or aspect from another. Thus, terms such as "first," "second," and other numerical terms when used herein do not imply a sequence or order unless clearly indicated by the context. Thus, a first element, step, component, region, layer or section discussed below could be termed a second element, step, component, region, layer or section without departing from the teachings of the disclosure.

The non-limiting embodiments described herein are with respect to dispenser applicator packages. The dispenser applicator packages and methods for making the dispenser applicator packages may be modified for a variety of applications and uses while remaining within the spirit and scope of the claims. The embodiments and variations described herein, and/or shown in the drawings, are presented by way of example only and are not limiting as to the scope and spirit. The descriptions herein may be applicable to all embodiments of the device and the methods for making the devices.

Disclosed herein are implementations of dispenser applicator packages. The dispenser applicator packages can contain a material, substance, and the like (collectively "usable material") can be a deodorant, a candy, a food item, a cosmetic, and the like. The implementations shown are illustrative and other implementations are within the scope of the specification and claims described herein. For purposes of illustration, certain aspects, features, and the like are described with respect to implementations. These aspects, features, and the like are appropriately applicable to and interchangeable with other implementations described herein.

In implementations, the packaging described herein provide sealing, structure, and a dosage mechanism to dispenser applicator packages by using injection molding (IM), in-mold labeling (IML) processing, and/or combinations thereof to fuse, weld, or bond (collectively "fuse") a barrier layer to an internal surface of a content or material carrying structure and fuse a ratcheting mechanism to the barrier layer. In implementations, the barrier layer and the ratcheting mechanism are injection molded and/or fused to the content carrying structure. In implementations, the content carrying structure can be a paperboard, pressed fiber board or film, heavy paper, and the like tubular or conical sleeve. In implementations, the ratcheting mechanism can provide a positive stop when using the dispenser applicator package. In implementations, the ratcheting mechanism can provide a metered dose of material or provide access to a metered amount of material.

In implementations, the components of the dispenser applicator packages can be recyclable, biodegradable, marine biodegradable, and the like. In implementations, the dispenser applicator packages and/or the components of the dispenser applicator packages can be made from sustainable materials, recyclable materials, biodegradable materials, bio-based resins, weight-optimized biodegradable plastic, and the like. In implementations, the dispenser applicator packages and/or the components of the dispenser applicator packages can be of paper, fiber based, pressed fiber, and/or plastic construction, which can be sustainable materials, recyclable materials, biodegradable materials, bio-based resins, and/or weight-optimized biodegradable plastic. The dispenser applicator packages and/or the components of the dispenser applicator packages can efficiently use recyclable, biodegradable, and the like materials for improved sustainability.

Figure 2:
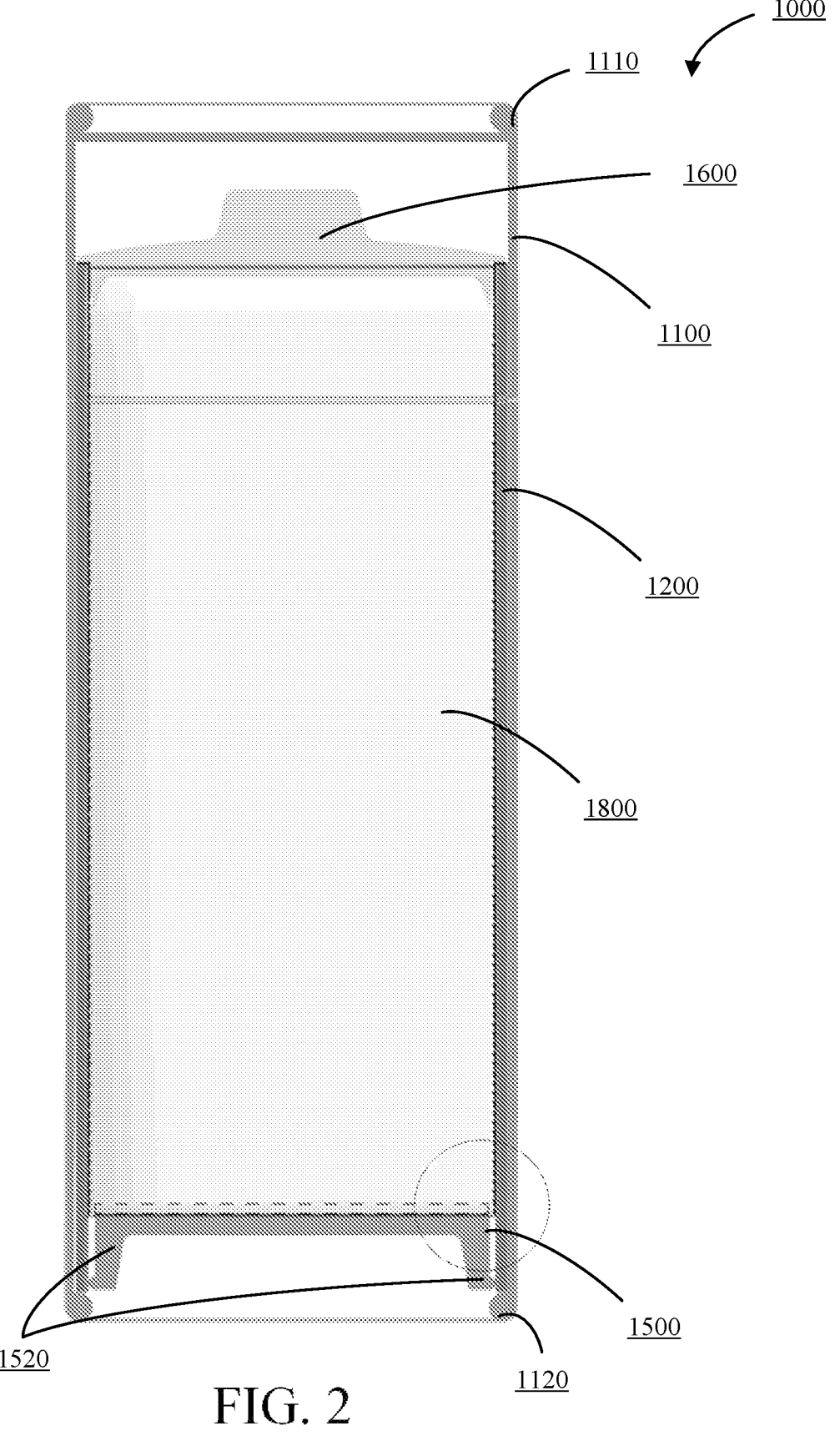
FIG. 2 is a partial cutaway cross-sectional view of the dispenser applicator package of FIG. 1 in accordance with implementations.
Figure 3:
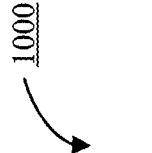
FIG. 3 is an exploded view of the dispenser applicator package of FIG. 1 in accordance with implementations.

FIG. 1 is a diagram of an example dispenser applicator package 1000 in accordance with implementations. FIG. 2 is a partial cutaway cross-sectional view of the dispenser applicator package 1000 of FIG. 1 in accordance with implementations. FIG. 3 is an exploded view of the dispenser applicator package 1000 of FIG. 1 in accordance with implementations.

The dispenser applicator package 1000 can include an outer tubular component 1100, an inner tubular component 1200, a barrier layer 1300, a ratcheting mechanism 1400, an elevator mechanism 1500, an elevator seal 1600, and an access seal 1700. In implementations, the dispenser applicator package 1000 can include a useable material 1800.

In implementations, the outer tubular component 1100 can be paperboard, biodegradable plastic, or like materials. The outer tubular component 1100 can include a pair of bead moldings 1110 and 1120 on a top and bottom of the outer tubular component 1100.

In implementations, the inner tubular component 1200 can be paperboard, biodegradable plastic, or like materials.

In implementations, the paperboard can be a sheet of paperboard that can be shaped into a tubular structure.

In implementations, the barrier layer 1300 can be made from a material that is impermeable and/or non-reactive with respect to the useable material.

In implementations, the ratcheting mechanism 1400 can be injection molded from sustainable materials, recyclable materials, biodegradable materials, bio-based resins, weight-optimized biodegradable plastic, and the like. The ratcheting mechanism 1400 can provide stepwise or metered access to the useable material.

In implementations, the ratcheting mechanism 1400 and the barrier layer 1300 can be an integrated component. In implementations, the integrated component can be injection molded from sustainable materials, recyclable materials, biodegradable materials, bio-based resins, weight-optimized biodegradable plastic, and the like.

In implementations, the elevator mechanism 1500 can be injection molded from sustainable materials, recyclable materials, biodegradable materials, bio-based resins, weight-optimized biodegradable plastic, and the like. The elevator mechanism 1500 can be moveable relative to the inner tubular component 1100. The elevator mechanism 1500 can include a base 1510 and a pair of legs 1520. The pair of legs 1520 can engage the bead molding 1120 as a stopping mechanism. The base 1510 can include an overhang portion 1512 which can engage the ratcheting mechanism 1400. The overhang portion 1512 and the ratcheting mechanism 1400 act as a stop when a user is using or accessing the useable material.

In implementations, the elevator seal 1600 can be fused to the base 1510 of the elevator mechanism 1500. The elevator seal 1600 can be made from a material that is impermeable and/or non-reactive with respect to the useable material. In implementations, the elevator mechanism 1500 and the elevator seal 1600 can be integrally injection molded or the like.

In implementations, the access seal 1700 can be a plug or a heat seal which can be applied, inserted, and/or added after insertion of the useable material into the inner tubular component 1100. In implementations, the access seal 1700 can be made from materials that are impermeable and/or non-reactive with respect to the useable material.

Operationally, the outer tubular component 1100 and the inner tubular component 1200 can be formed from paperboard, for example. In implementations, the barrier layer 1300 can be fused to the inner surface of the inner tubular component 1100. In implementations, the ratcheting mechanism 1400 can be fused to the barrier layer 1300. In implementations, the barrier layer 1300 and the ratcheting mechanism 1400 can integrally injection molded and fused to the inner surface of the inner tubular component 1100. The elevator mechanism 1500 can be placed or positioned between inner surfaces of the inner tubular component 1200 at one end of the outer tubular component 1100 and/or the inner tubular component 1200. The elevator seal 1600 can be fused to the base 1510 of the elevator mechanism 1500. The useable material 1800 can be deposited, inserted, and/or the like into the inner tubular component 1200. The access seal 1700 can be attached, fused, and/or the like after filling the inner tubular component 1200 with the useable material 1800.

A user can remove the access seal 1700 to access the useable material 1800. The user can push on the elevator mechanism 1500 to push the useable material 1800 out of the inner tubular component 1200 and/or the outer tubular component 1100. The pushing action engages the overhang portion 1512 with the ratcheting mechanism 1400. After pushing is complete, the overhang portion 1512 and the ratcheting mechanism 1400 prevent the elevator mechanism 1500 from going in the reverse direction when the user is using the useable material 1800. That is, the overhang portion 1512 and the ratcheting mechanism 1400 can act as a stop for the elevator mechanism 1500.

Figures 4A, 4B, 4C:
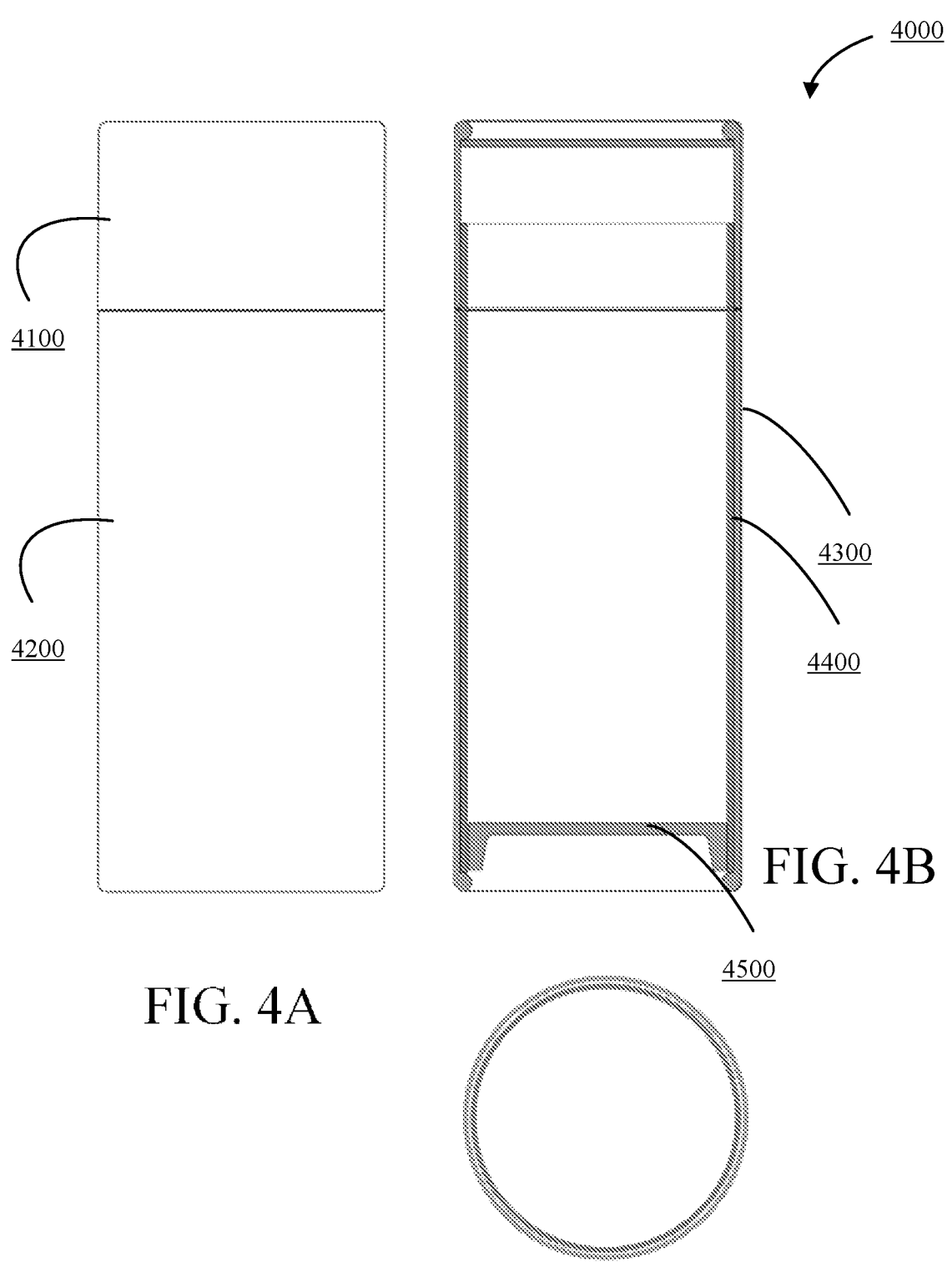
FIGS. 4A-C are diagrams of an example dispenser applicator package in accordance with implementations.

FIGS. 4A-C are diagrams of an example dispenser applicator package in accordance with implementations. FIG. 4A is a diagram of an example dispenser applicator package 4000 in accordance with implementations. For example, the dispenser applicator package 4000 can be the dispenser applicator package 1000 of FIG. 1. The dispenser applicator package 4000 can include a cap 4100 and a body 4200. FIG. 4B is a cutaway view of the dispenser applicator package 4000 in accordance with implementations. The body 4200 of the dispenser applicator package 4000 can include an outer tubular structure 4300, an inner tubular structure 4400, and an elevator mechanism 4500. FIG. 4C is a top view of the dispenser applicator package 4000 in accordance with implementations.

Operationally, the dispenser applicator package 4000 is similar to the dispenser applicator package 1000.

Figures 5A, 5B, 5C:
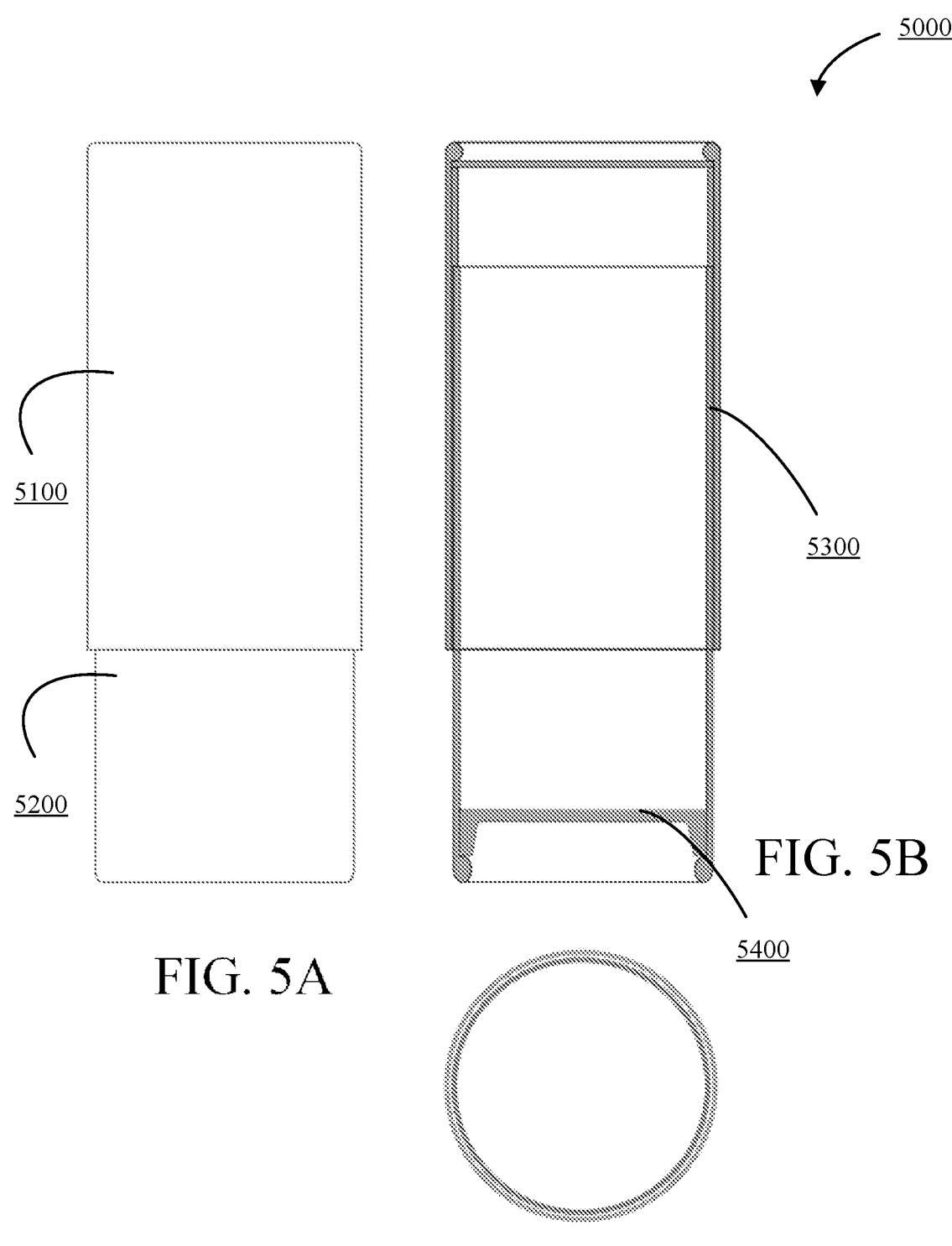
FIGS. 5A-C are diagrams of an example dispenser applicator package in accordance with implementations.

FIGS. 5A-C are diagrams of an example dispenser applicator package 5000 in accordance with implementations. FIG. 5A is a diagram of an example dispenser applicator package 5000 in accordance with implementations. The dispenser applicator package 5000 can include a cap 5100 and a body 5200. FIG. 4B is a cutaway view of the dispenser applicator package 5000 in accordance with implementations. The body 5200 of the dispenser applicator package 5000 can include a tubular structure 5300 and an elevator mechanism 5400. FIG. 5C is a top view of the dispenser applicator package 5000 in accordance with implementations.

In implementations, a barrier layer and a ratcheting mechanism, as described with respect to FIG. 1, can be fused to an inner surface of the tubular structure 5300. Operationally and functionally, the dispenser applicator package 5000 is similar to the dispenser applicator package 1000 and/or 4000 except that one tubular structure or component can be used instead of two tubular structures.

FIGS. 6A-H are diagrams of an example shapes for dispenser applicator packages in accordance with implementations. The shapes shown in FIGS. 6A-H are applicable to at least the dispenser applicator packages 1000, 4000, and/or 5000, for example. FIG. 6A is an example of a circular footprint 6000 of a dispenser applicator package. FIG. 6B is an example of an oval footprint 6100 of a dispenser applicator package. FIG. 6C is an example of an oval footprint 6200 of a dispenser applicator package. FIG. 6D is an example of a rounded rectangular footprint 6300 of a dispenser applicator package. FIG. 6E is an example of an oval footprint 6400 of a dispenser applicator package. FIG. 6F is an example of an oval footprint 6500 of a dispenser applicator package. FIG. 6G is an example of an oval footprint 6600 of a dispenser applicator package. FIG. 6F is an example of a cutoff oval footprint 6700 of a dispenser applicator package.

Figures 7A, 7B, 7C, 7D, 7E, 7F:
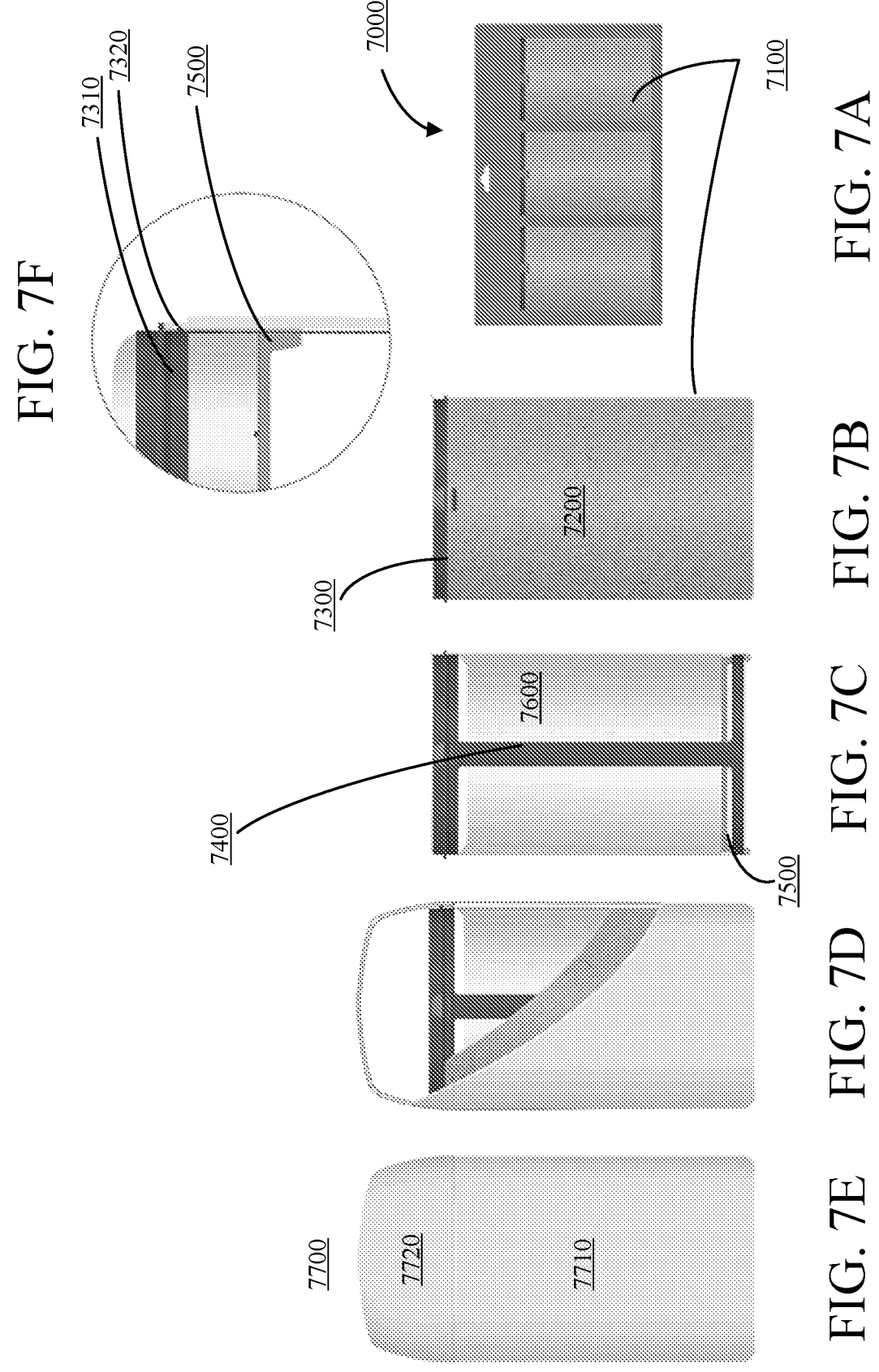
FIGS. 7A-F are diagrams of an example dispenser applicator package and a refill cartridge in accordance with implementations.

FIGS. 7A-F are diagrams of an example dispenser applicator shell and a refill cartridge in accordance with implementations. FIG. 7A is a diagram of a refill cartridge pack 7000 in accordance with implementations. FIG. 7B is a diagram of an example refill cartridge 7100 in accordance with implementations. FIG. 7C is an exposed or cutaway view of the refill cartridge 7100 in accordance with implementations. FIG. 7D is an exposed or cutaway view of the refill cartridge 7100 in a dispenser applicator shell 7700 in accordance with implementations. FIG. 7D is a diagram of the dispenser applicator shell 7700 in accordance with implementations. FIG. 7E is an exploded view of the refill cartridge 7100 in the dispenser applicator shell 7700 when useable material is almost finished in accordance with implementations.

The refill cartridge pack 7000 can include a defined number of refill cartridges 7100. The refill cartridge 7100 can include a tubular component or body 7200, an engagement mechanism 7300, a ratcheting mechanism 7400, an elevator mechanism 7500, and useable material 7600. In implementations, a barrier layer (as described herein) can be fused to an internal surface of the tubular component or body 7200 prior to introduction of the useable material 7600. In implementations, an elevator seal, as described herein, can be fused to the elevator mechanism 7500 prior to introduction of the useable material 7600. In implementations, the engagement mechanism 7300 and the ratcheting mechanism 7400 (collectively "internal mechanism") can be integrally injection molded and the like and fused to the barrier layer on the tubular component or body 7200. In implementations, the internal mechanism and the barrier layer (collectively "integrated internal mechanism") can be integrally injection molded and the like and fused to the inner surface of the tubular component or body 7200.

In implementations, the engagement mechanism 7300 can include a bead 7310 and a ledge 7320 which can engage an internal surface of the dispenser applicator shell 7700. In implementations, the dispenser applicator shell 7700 can include a body 7710 and a cap 7720. In implementations, the dispenser applicator shell 7700 can be made from the materials described herein.

Operationally, a refill cartridge 7100 can be prepared by forming the tubular component or body 7200, fusing the barrier layer to the tubular component or body 7200, fusing the internal mechanism to the barrier layer, placing the elevator mechanism 7500 in the tubular component or body 7200, fusing the elevator seal, and filling the tubular component or body 7200 with the useable material 7600. In implementations, fusing the integrated internal mechanism to the tubular component or body 7200. In implementations, the elevator mechanism 7500 and the elevator seal are integrally formed.

The filled refill cartridge 7100 can be inserted into the dispenser applicator shell 7700 and can be held in place upon engagement of the bead 7310 and the ledge 7320. In implementations, an audible click can be heard upon satisfactory placement of the refill cartridge 7100 in the dispenser applicator shell 7700. Upon using the entirety of the useable material 7600, the now empty refill cartridge 7100 can be removed by disengaging the engagement mechanism 7300 from the dispenser applicator shell 7700 and pulling the refill cartridge 7100 away from the dispenser applicator shell 7700 shell.

Figures 8A, 8B, 8C, 8D, 8E, 8F, 8G, 8H:
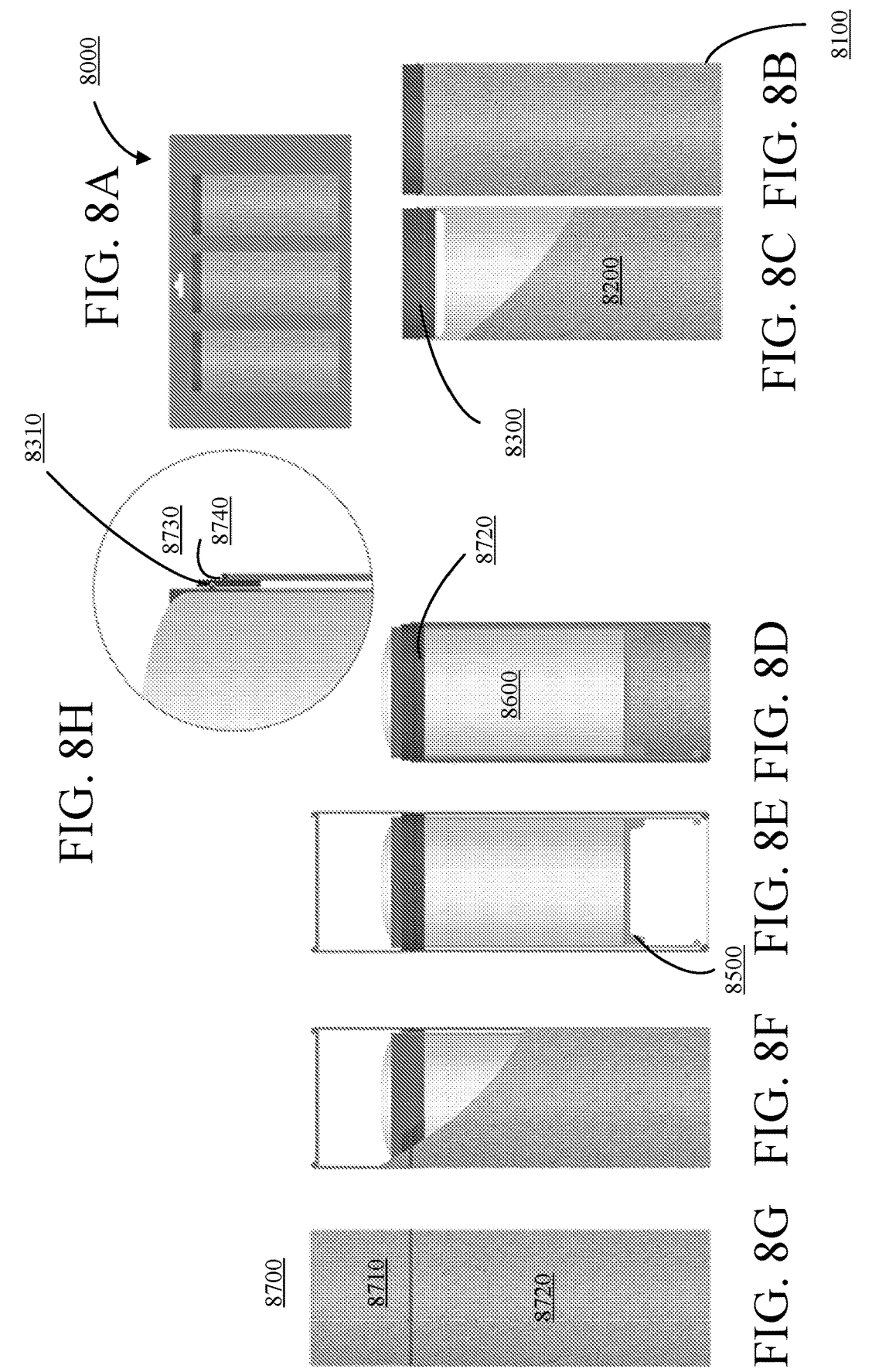
FIGS. 8A-H are diagrams of an example dispenser applicator package and a refill cartridge in accordance with implementations.

FIGS. 8A-H are diagrams of an example dispenser applicator package and a refill cartridge in accordance with implementations. FIG. 8A is a diagram of a refill cartridge pack 8000 in accordance with implementations. FIG. 8B is a diagram of an example refill cartridge 8100 in accordance with implementations. FIG. 8C is an exposed or cutaway view of the refill cartridge 8100 in accordance with implementations. FIG. 8D is an exposed or cutaway view of the refill cartridge 8100 in a dispenser applicator shell 8700 in accordance with implementations. FIG. 8E is an exposed or cutaway view of the refill cartridge 8100 in a dispenser applicator shell 8700 in accordance with implementations.

FIG. 8F is an exposed or cutaway view of the refill cartridge 8100 in a dispenser applicator shell 8700 in accordance with implementations. FIG. 8G is a diagram of the dispenser applicator shell 8700 in accordance with implementations. FIG. 8H is an exploded view of the refill cartridge 8100 in the dispenser applicator shell 8700 in accordance with implementations.

The refill cartridge pack 8000 can include a defined number of refill cartridges 8100. The refill cartridge 8100 can include a tubular component or body 8200, an engagement mechanism 8300, an optional ratcheting mechanism (not shown), an elevator mechanism 8500, and useable material 8600. In implementations, a barrier layer (as described herein) can be fused to an internal surface of the tubular component or body 8200 prior to introduction of the useable material 8600. In implementations, an elevator seal, as described herein, can be fused to the elevator mechanism 8500 prior to introduction of the useable material 8600. In implementations, the engagement mechanism 8300 and the ratcheting mechanism when applicable (collectively "internal mechanism") can be integrally injection molded and the like and fused to the barrier layer on the tubular component or body 8200. In implementations, the internal mechanism and the barrier layer (collectively "integrated internal mechanism") can be integrally injection molded and the like and fused to the inner surface the tubular component or body 8200.

In implementations, the dispenser applicator shell 8700 can include a body 8710 and a cap 7720. In implementations, the dispenser applicator shell 8700 can include an engagement mechanism 8730 formed on one end of the dispenser applicator shell 8700. In implementations, the engagement mechanism 8730 includes a groove 8740. In implementations, the dispenser applicator shell 8700 can be made from the materials described herein.

In implementations, the engagement mechanism 8300 can include a bead 8310 which can engage the groove 8740 of the dispenser applicator shell 8700.

Operationally, a refill cartridge 8100 can be prepared by forming the tubular component or body 8200, fusing the barrier layer to the tubular component or body 8200, fusing the ratcheting mechanism to the barrier layer when appropriate, fusing the engagement mechanism to the tubular component or body 8200, placing the elevator mechanism 8500 in the tubular component or body 8200, fusing the elevator seal, and filling the tubular component or body 8200 with the useable material 8600. In implementations, fusing the internal mechanism to the tubular component or body 8200. In implementations, fusing the integrated internal mechanism to the tubular component or body 8200. In implementations, the elevator mechanism 8500 and the elevator seal are integrally formed.

The filled refill cartridge 8100 can be inserted into the dispenser applicator shell 8700 and can be held in place upon engagement of the bead 8310 with the groove 8740. In implementations, an audible click can be heard upon satisfactory placement of the refill cartridge 8100 in the dispenser applicator shell 8700. Upon using the entirety of the useable material 8600, the now empty refill cartridge 8100 can be removed by disengaging the engagement mechanism 8300 from the dispenser applicator shell 8700 and pulling the refill cartridge 8100 away from the dispenser applicator shell 8700 shell.

The packages described herein may be manufactured using compression molding, injection molding, in-mold labeling, and other like production processes. The packages may be made from biodegradable materials, recyclable materials, and the like.

The construction and arrangement of the methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials and components, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A package comprising:
a tubular structure;
a barrier layer fused to an inner surface of the tubular structure;
a ratcheting mechanism fused to the barrier layer;
an elevator mechanism placed at one end of the tubular structure;
an elevator seal fused to the elevator mechanism; and
an access seal fused to a useable material at a remaining end of the tubular structure.

2. The package of claim 1, wherein the ratcheting mechanism is configured to provide a positive stop when using the package.

3. The package of claim 2, wherein the tubular structure further comprises:
a pair of bead moldings at each end of the tubular structure.

4. The package of claim 3, wherein the elevator mechanism further comprises:
a base; and
a pair of legs connected to the base,
wherein the pair of legs are configured to engage the pair of bead molding as a stopping mechanism.

5. The package of claim 4, wherein the base further comprises:

overhang sections extending from the base, wherein the overhang sections are configured to engage the ratcheting mechanism as a stopping mechanism.

6. The package of claim 1, wherein the ratcheting mechanism is configured to provide a metered amount of the useable material.

7. The package of claim 1, wherein the ratcheting mechanism is configured to provide access to a metered amount of the useable material.

8. The package of claim 1, wherein the barrier layer is impermeable and non-reactive with the useable material.

9. The package of claim 1, wherein the tubular structure further comprises:
an outer tubular structure; and
an inner tubular structure,
wherein the barrier layer is fused to an inner surface of the inner tubular structure, the elevator mechanism is placed at one end of the inner tubular structure, and the access seal is fused to the useable material at a remaining end of the inner tubular structure.

10. A refillable device comprising:
a dispenser applicator shell; and
the package of claim 1, the package configured to fit within the dispenser applicator shell,
wherein the package further comprises a package engagement mechanism integrated with the ratchet mechanism, and
wherein the package engagement mechanism is configured to engage the dispenser applicator shell when the package is placed in the dispenser applicator shell.

11. The refillable device of claim 10, wherein the dispenser applicator shell further comprises:
an engagement mechanism configured to engage the package engagement mechanism when the package is placed in the dispenser applicator shell.

12. The refillable device of claim 11, wherein the engagement mechanism is a groove and the package engagement mechanism includes a bead configured to engage the groove.

13. The refillable device of claim 12, wherein the ratcheting mechanism is configured to provide a positive stop when using the package.

14. The refillable device of claim 13, wherein the tubular structure further comprises:
a pair of bead moldings at each end of the tubular structure.

15. The refillable device of claim 14, wherein the elevator mechanism further comprises:
a base; and
a pair of legs connected to the base,
wherein the pair of legs are configured to engage the pair of bead molding as a stopping mechanism.

16. The refillable device of claim 15, wherein the base further comprises:
overhang sections extending from the base, wherein the overhang sections are configured to engage the ratcheting mechanism as a stopping mechanism.

17. The refillable device of claim 16, wherein the ratcheting mechanism is configured to provide a metered amount of the useable material.

18. The refillable device of claim 16, wherein the ratcheting mechanism is configured to provide access to a metered amount of the useable material.

19. The refillable device of claim 17, wherein the barrier layer is impermeable and non-reactive with the useable material.

* * * * *